US012625343B2

(12) United States Patent
Inoue

(10) Patent No.: US 12,625,343 B2
(45) Date of Patent: May 12, 2026

(54) LENS APPARATUS AND IMAGE PICKUP APPARATUS HAVING THE SAME

(71) Applicant: CANON KABUSHIKI KAISHA, Tokyo (JP)

(72) Inventor: Katsuhiro Inoue, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 404 days.

(21) Appl. No.: 18/309,997

(22) Filed: May 1, 2023

(65) Prior Publication Data

US 2023/0367095 A1 Nov. 16, 2023

(30) Foreign Application Priority Data

May 16, 2022 (JP) .................................. 2022-079906

(51) Int. Cl.
G02B 7/02 (2021.01)
G02B 7/00 (2021.01)
G03B 17/12 (2021.01)

(52) U.S. Cl.
CPC ............. G02B 7/021 (2013.01); G02B 7/005 (2013.01); G02B 7/023 (2013.01); G03B 17/12 (2013.01)

(58) Field of Classification Search
None
See application file for complete search history.

(56) References Cited

U.S. PATENT DOCUMENTS

| | | | | |
|---|---|---|---|---|
| 7,544,004 B2 * | 6/2009 | Kawai | ...................... | G02B 7/10 |
| | | | | 396/529 |
| 8,498,060 B2 | 7/2013 | Ito et al. | | |

FOREIGN PATENT DOCUMENTS

| | | | |
|---|---|---|---|
| JP | 2001281514 A | | 10/2001 |
| JP | 2009150950 A | * | 7/2009 |
| JP | 2012083717 A | | 4/2012 |
| JP | 2015210490 A | | 11/2015 |
| JP | 2018072775 A | | 5/2018 |

* cited by examiner

*Primary Examiner* — Christopher Stanford
(74) *Attorney, Agent, or Firm* — ROSSI, KIMMS & McDOWELL LLP

(57) ABSTRACT

The lens apparatus comprises a second lens barrel configured to hold a lens, a first guide bar configured to guide the second lens barrel in an optical axis direction, a bar holding member that holds one end side of the first guide bar, a cam follower engaged with the bar holding member and including a portion eccentric with respect to a rotation axis, and a first fixing member configured to hold the bar holding member via the cam follower. A position on of the one end side of the first guide bar in a plane perpendicular to the optical axis is adjustable by rotating the cam follower with respect to the fixing member from a direction orthogonal to a direction along the optical axis of the lens.

11 Claims, 13 Drawing Sheets

LENS APPARATUS AND IMAGE PICKUP APPARATUS HAVING THE SAME

BACKGROUND OF THE INVENTION

Field of the Invention

The present disclosure relates to a lens apparatus and an image pickup apparatus having the same.

Description of the Related Art

Description of the Related Art Conventionally, in a lens barrel of an image pickup apparatus such as a digital camera, tilt adjustment or eccentricity adjustment of a lens holding frame that holds a lens is required in order to bring out desired optical performance.

Japanese Patent Application Laid-Open No. 2009-150950 discloses an adjustment mechanism in which a bearing member for supporting one end of a guide shaft is composed of a first bearing member and a second bearing member, and the eccentric amount and eccentric direction of the guide shaft can be independently adjusted by adjusting the rotational positions of the first bearing member and the second bearing member.

However, in Japanese Patent Application Laid-Open No. 2009-150950, in order to adjust the tilt of the guide shaft, it is necessary to access the first bearing member and the second bearing member incorporated from the optical axis direction by an adjustment tool from one side in the optical axis direction. With this configuration, a space for adjustment is required on the side opposite to the lens frame suspended by the guide shaft, and thus there is a concern that the lens barrel may be increased in size.

SUMMARY OF THE INVENTION

An aspect of embodiments provides, a lens apparatus advantageous in optical adjustment.

According to an embodiment of the present disclosure, a lens apparatus comprising: a holding frame configured to hold a lens; a guide member configured to guide the holding frame in an optical axis direction; a holding member that holds one end side of the guide member; an operating member engaged with the holding member and including a portion eccentric with respect to a rotary axis; and a fixing member configured to hold the holding member via the operating member, wherein a position of the guide member on one end side in a plane perpendicular to an optical axis is adjustable by rotating the operating member with respect to the fixing member from a direction orthogonal to a direction along the optical axis of the lens.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. In drawings, an optical axis direction along an optical axis OA is defined as an X direction, a vertical direction in FIG. 1 orthogonal to the X direction is defined as a Z direction, and a direction orthogonal to both the X direction and the Z direction is defined as a Y direction.

Embodiment 1

Figure 1:
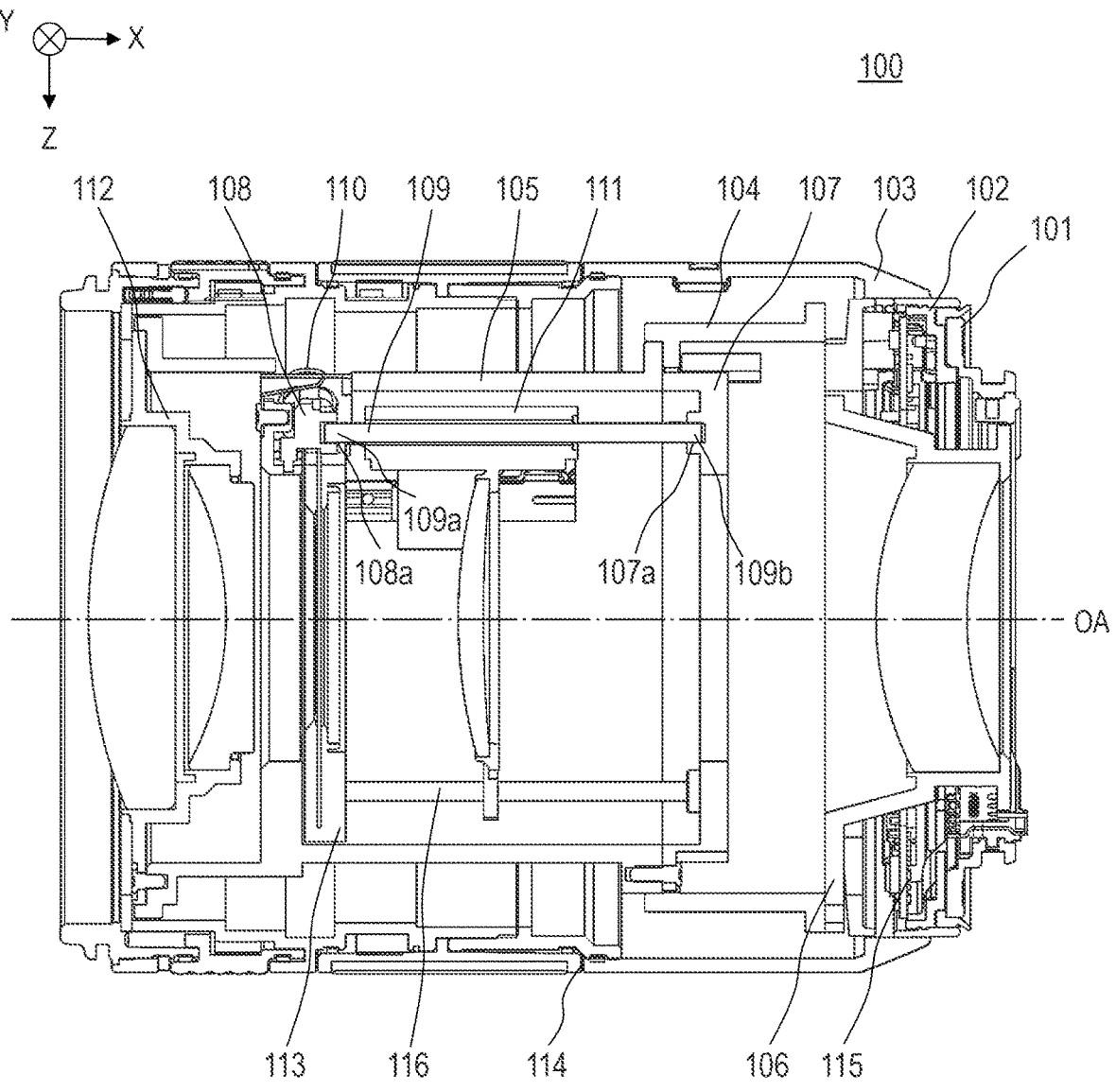
FIG. 1 is a schematic sectional view of a lens apparatus (100) according to embodiment 1.

Hereinafter, a lens apparatus 100 according to a first embodiment of the present disclosure will be described with reference to FIG. 1. FIG. 1 is a schematic cross-sectional view of a lens apparatus 100 according to a first embodiment of the present disclosure. The optical axis direction of the lens apparatus 100 is regulated by the diameter of the mount barrel 102 being fitted to the mount 101, which is detachable from a camera body (not illustrated), and being in contact therewith in the optical axis direction.

The mount barrel 102 is diameter-fitted to the exterior barrel 103, and is regulated in the optical axis direction by abutting in the optical axis direction. The mount barrel 102 is sandwiched between the mount 101 and the exterior barrel 103, and the mount 101 and the exterior barrel 103 are fastened with screws.

The exterior barrel 103 is diameter-fitted to a connecting barrel 104, is regulated in the optical axis direction by abutting in the optical axis direction, and is fastened by screws (not illustrated) in the optical axis direction. The connecting barrel 104 is diameter-fitted to a first fixing member 105 (fixing member), is regulated in the optical axis direction by abutting in the optical axis direction, and is fastened by screws in the optical axis direction. Similarly, the third lens barrel 106 holding the lens is diameter-fitted to the connecting barrel 104, is regulated in the optical axis direction by abutting in the optical axis direction, and is fastened by screws in the optical axis direction.

The position of the second fixing member 107 in a plane orthogonal to the optical axis OA is determined by two bosses (not illustrated) which protrude in the optical axis direction with respect to the first fixing member 105 and are arranged at different angular positions around the optical axis and two engagement holes (not illustrated) on the first fixing member 105 side which engage with the bosses. Further, the second fixing member 107 is regulated in the optical axis direction by abutting in the optical axis direction, and is fastened by screws (not illustrated) in the optical axis direction.

The bar holding member 108 (holding member) has a bar holding portion 108a, and the bar holding portion 108a holds one end portion 109a (one end side) of the first guide bar 109 (guide member). The bar holding member 108 engages with a cam follower 110 (operating member, eccentric roller), and is held by the first fixing member 105 via the cam follower 110. A detailed configuration around the bar holding member 108 will be described later. The second fixing member 107 has a bar holding portion 107a, and the bar holding portion 107a holds the other end portion 109b of the first guide bar 109.

A second lens barrel 111 (holding frame) that holds a lens (optical element) is a focus group. A driving unit that moves the second lens barrel 111 forward and backward in the optical axis direction includes a focus actuator (not illustrated) serving as a driving source. The second lens barrel 111 slidably engages with a first guide bar 109 extending in the optical axis direction so as to be linearly guided in the optical axis direction. A driving force is transmitted to the second lens barrel 111 via a rack (not illustrated) that engages with a driving portion of a focus actuator, and the second lens barrel 111 can move forward and backward in the optical axis direction.

The rack is held so as to be rotatable about an axis (not illustrated) extending in the optical axis direction with respect to the second lens barrel 111. The rack is biased in the rotational direction by a biasing force in a torsional direction generated by a torsion coil spring (not illustrated), and is pressed against the first guide bar 109 from one direction of the radial direction. The rack is biased by a biasing force in the optical axis direction generated by a torsion coil spring, and is pressed against the second lens barrel 111 from one direction in the optical axis direction. The rack, the first guide bar 109, and the second lens barrel 111 are pressed against each other by these biasing forces, so that rattling therebetween is prevented.

The first lens barrel 112 is diameter-fitted to the first fixing member 105, is regulated in the optical axis direction by abutting in the optical axis direction, and is fastened by screws in the optical axis direction. The light amount adjustment member 113 adjusts the amount of light. A detection member (not illustrated) detects the rotation amount and the rotation direction of the focus ring 114, which is one of the components constituting the exterior unit. The focus actuator is driven by a predetermined drive signal from the control circuit on the substrate 115 based on the output of the detection member, and the second lens barrel 111 moves forward and backward in the optical axis direction.

A characteristic configuration of the embodiment 1 will be described in detail below. The second lens barrel 111 is provided with two cylindrical hole portions (not illustrated) spaced apart from each other in the optical axis direction, and the movement of the second lens barrel 111 in the optical axis direction is guided by fitting the cylindrical hole portions to the first guide bar 109. Further, by engaging a U-shaped groove (not illustrated) provided in the second lens barrel 111 with the second guide bar 116, the rotation of the second lens barrel 111 around the first guide bar 109 is regulated.

Figure 2:
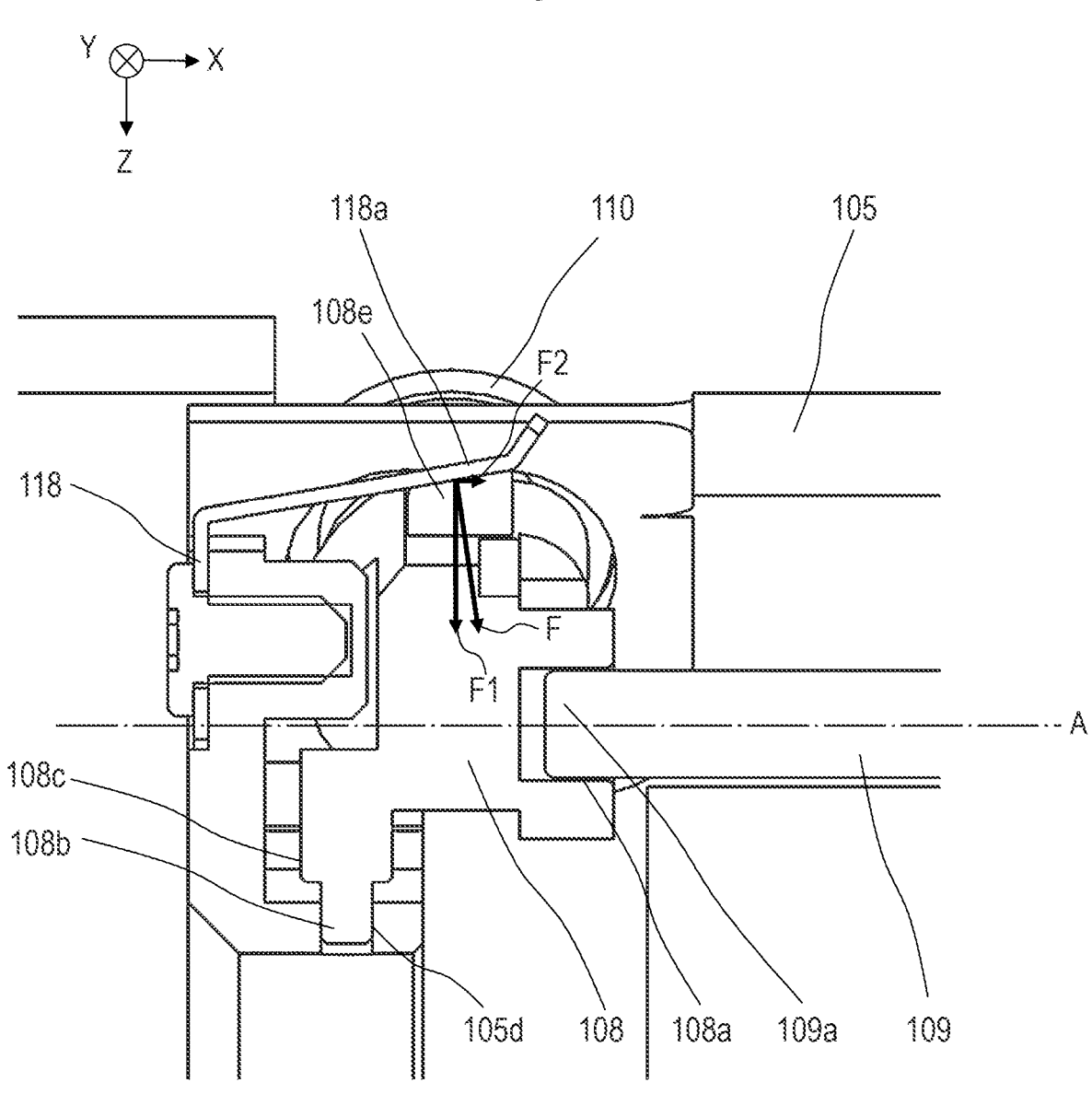
FIG. 2 is a partial sectional view of the periphery of the bar holding member (108).
Figure 3:
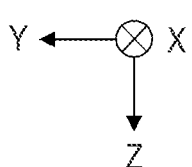
FIG. 3 is a cross-sectional view showing a state where the cam follower (110) is fastened to the bar holding member (108).
Figure 3:
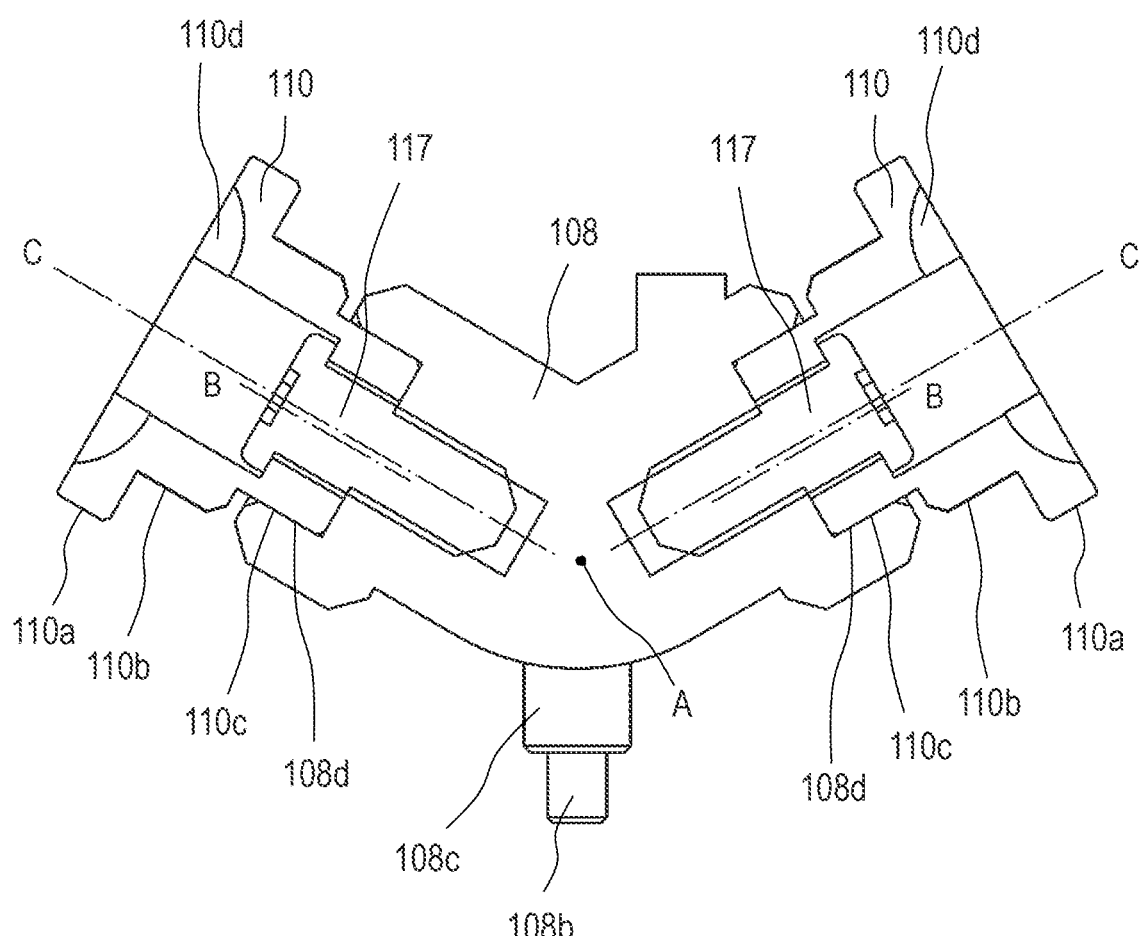

FIG. 2 is a partial sectional view showing details of the periphery of the bar holding member 108. FIG. 3 is a cross-sectional view showing a state where the cam follower 110 is fastened to the bar holding member 108. In FIG. 3 two cam followers 110 are attached to the bar holding member 108 at different angular positions about the axis A of the first guide bar 109 as viewed in the direction orthogonal to the optical axis OA. Since the two cam followers 110 have the same shape, one cam follower 110 will be described below as a representative.

The cam follower 110 is provided with a first cylindrical portion 110a, a second cylindrical portion 110b, and a third cylindrical portion 110c. The axis C of the first cylindrical portion 110a is in a plane orthogonal to the optical axis OA, that is, in the YZ plane.

The third cylindrical portion 110c of the cam follower 110 engages with the engaging portion 108d of the bar holding member 108, and the cam follower 110 is rotatably fastened to the bar holding member 108 by the fastening member 117. After the eccentricity of the bar holding member 108 is adjusted, the fastening member 117 is completely fastened so that the cam follower 110 does not rotate.

The bar holding member 108 is provided with a second regulating portion 108b and a third regulating portion 108c. The second regulating portion 108b and the third regulating portion 108c are provided at positions different in angle from the cam follower 110 about the axis A of the first guide bar 109 on a plane (YZ plane) orthogonal to the optical axis OA.

Figure 4:
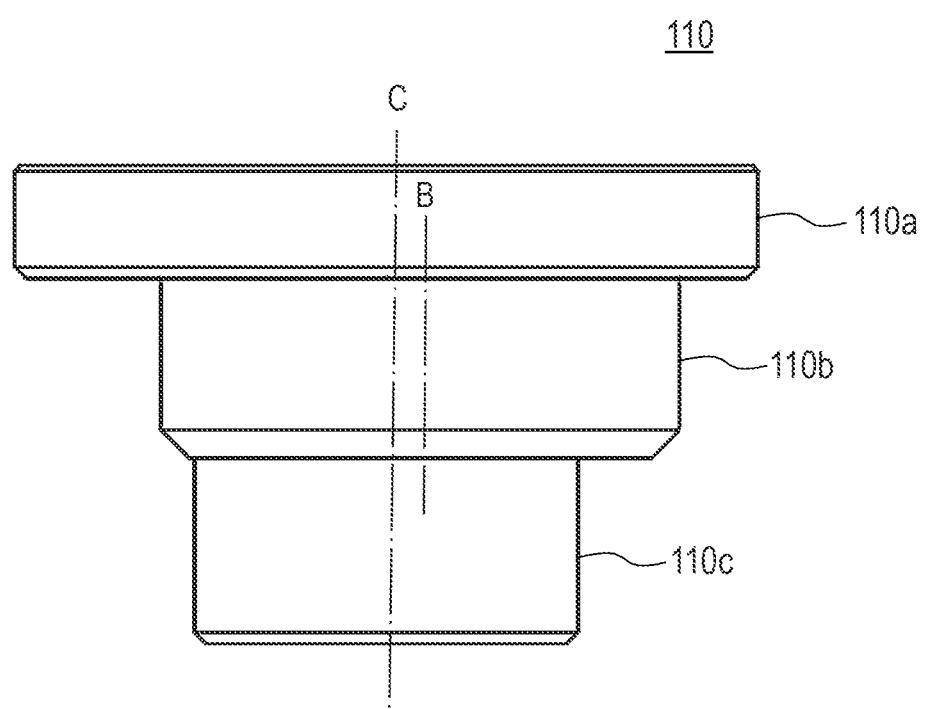
FIG. 4 is a side view of the cam follower (110).

FIG. 4 is a plan view of the cam follower 110 viewed from a direction different from that of the cam follower 110 illustrated in FIG. 3. The axis C of the first cylindrical portion 110a and the axis B of the second cylindrical portion 110b are eccentric to each other, and the axes of the first cylindrical portion 110a and the third cylindrical portion 110c are coaxial (axis C).

Figure 5:
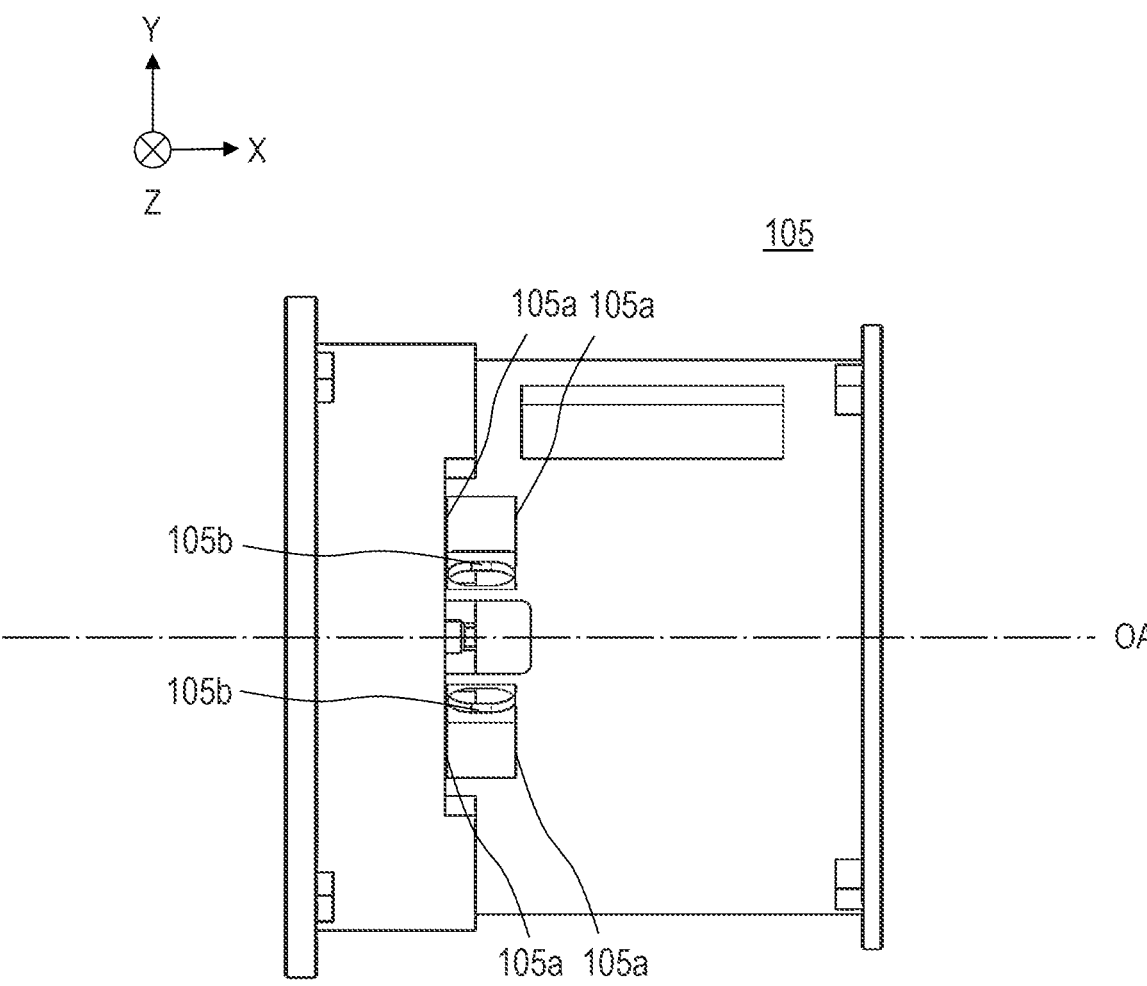
FIG. 5 is a plan view of the first fixing member (105) as viewed from the Z direction.

FIG. 5 is a diagram of the first fixing member 105 viewed from the Z direction. The first fixing member 105 is provided with a first regulating portion 105a that engages with the first cylindrical portion 110a of the cam follower 110 to regulate the movement of the cam follower 110 in the optical axis direction. And the first fixing member 105 is provided with a first long groove 105b (first groove portion) that engages with the second cylindrical portion 110b of the cam follower 110 to penetrate from the outer periphery to the inner periphery of the first fixing member 105. The longitudinal direction of the first long groove 105b is parallel to the optical axis OA. Since the movement of the cam follower 110 is regulated by the shape of the first long groove 105b, the first long groove 105b acts as a cam for the cam follower 110. And the second cylindrical portion 110b of the cam follower 110 is a follower that engages with the first long groove 105b.

Figure 6A:
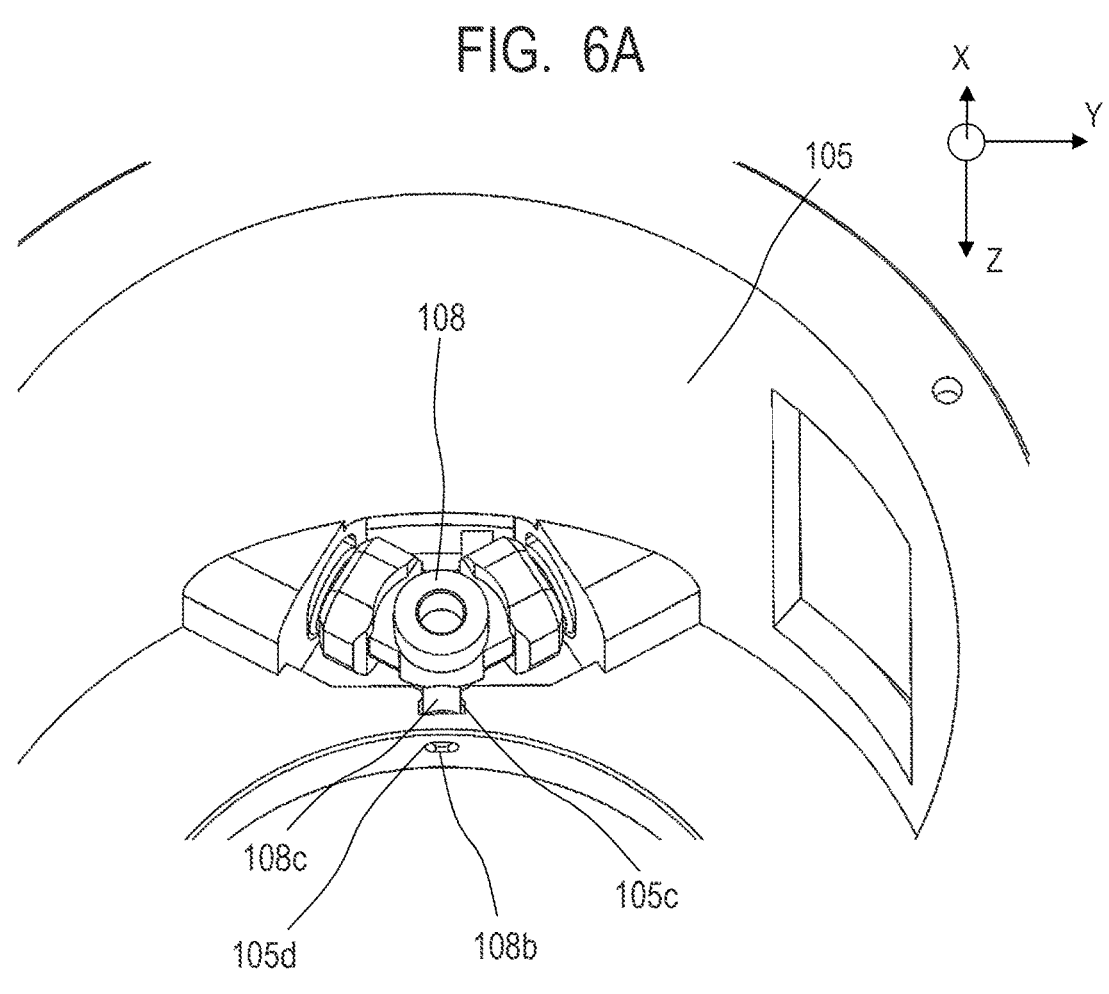
FIG. 6A is a perspective view of the first adjustment mechanism as viewed from the inside of the first fixing member (105).
Figure 6B:
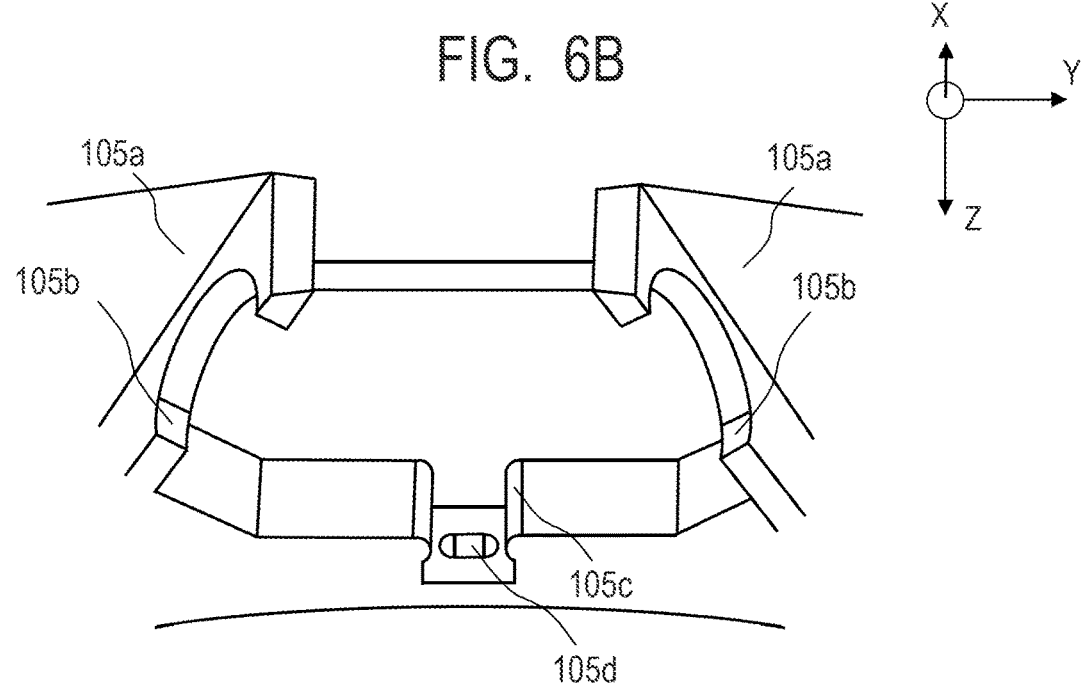
FIG. 6B is a partial cross-sectional view of a portion in which the bar holding member (108) is accommodated.

FIG. 6A is a perspective view of a state where the bar holding member 108 and a cam follower 110, which constitute a first adjustment mechanism (adjustment mechanism) to be described later, are held by the first fixing member 105, as viewed from the inner diameter side of the first fixing member 105. In FIG. 6A, the first guide bar 109 is not illustrated for easy understanding. FIG. 6B is a partial cross-sectional view of a portion in which the bar holding member 108 is accommodated. The second regulating portion 108b of the bar holding member 108 engages with the fourth regulating portion 105d of the first fixing member 105, and the movement of the bar holding member 108 in the optical axis direction is regulated. Further, the third regulating portion 108c of the bar holding member 108 engages with the first guide portion 105c provided in the first fixing member 105 and parallel to the optical axis OA, whereby the rotation of the first guide bar 109 of the bar holding member 108 around the axis A is regulated. The first regulating portion 105a, the first long groove 105b, the fourth regulating portion 105d, and the first guide portion 105c are provided at different angular positions around the axis A of the first guide bar 109. In the embodiment 1, the second regulating portion 108b and the third regulating portion 108c of the bar holding member 108 are distinguished from each other. However, the second regulating portion 108b and the third regulating portion 108c may be a single coaxial and same-diameter regulating portion in order to achieve the function.

Figure 7:
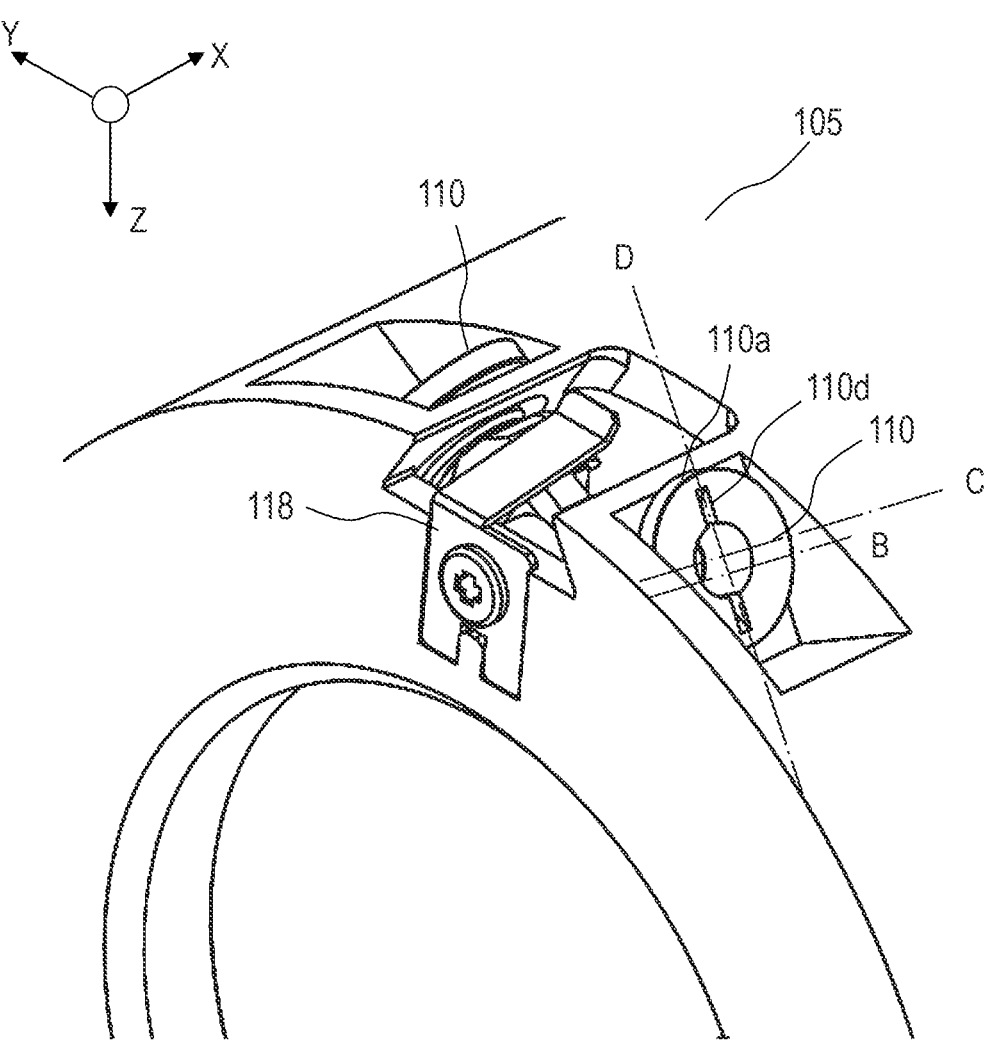
FIG. 7 is a perspective view of the first adjustment mechanism as viewed from the outside of the first fixing member (105).

FIG. 7 is a perspective view of a state where the bar holding member 108 and the cam follower 110 that constitute the first adjustment mechanism are held by the first fixing member 105, viewed from the outer diameter side of the first fixing member 105. Referring to FIG. 3 together with FIG. 7, the first cylindrical portion 110a of the cam follower 110 is provided with a cutout portion 110d which engages with a tool during optical adjustment and to which a rotational force is transmitted, and the cutout portion 110d extends in a direction D orthogonal to an axis C of the first cylindrical portion 110a. If the direction D is orthogonal to the direction in which the axis C of the first cylindrical portion 110a and the axis B of the second cylindrical portion 110b are eccentric, when the cam follower 110 is viewed from the cutout portion 110d side, the direction D serves as a mark for distinguishing which side is the direction of eccentricity of the second cylindrical portion 110b.

When the cam follower 110 is incorporated into the first fixing member 105, the position of the first guide bar 109 can be regulated by aligning the direction D in which the cutout portion 110d extends so as to be orthogonal to the optical axis direction which is the longitudinal direction of the first long groove 105b of the first fixing member 105. As a result, the tilting of the first guide bar 109 can be mechanically prevented in the initial state.

Next, the tilt adjustment of the first guide bar 109 will be described. During optical adjustment by rotating at least one of the two cam followers 110 from the outer peripheral side in the radial direction of the first fixing member 105, the bar holding member 108 is decentered in a plane orthogonal to the optical axis OA. The plurality of cam followers 110 can be independently operated. Then, the one end portion 109a of the first guide bar 109 held by the bar holding member 108 is eccentric in a plane orthogonal to the optical axis OA together with the bar holding member 108, and the first guide bar 109 is tilted with respect to the optical axis OA with the other end portion 109b of the first guide bar 109 as a fulcrum. That is, by operating the cam follower 110 from the direction orthogonal to the optical axis OA of the first fixing member 105, the tilt of the one end portion 109a side with respect to the optical axis direction of the first guide bar 109 can be adjusted in the plane orthogonal to the optical axis OA. The first adjustment mechanism is an adjustment mechanism (bar suspending group adjustment mechanism) for adjusting the tilt of the first guide bar 109. Therefore, the second lens barrel 111, which is linearly guided by the first guide bar 109, is also tilted, and the desired optical adjustment is performed.

In addition, if the tilt adjustment of the guide shaft is performed in a state of only a part of the optical system as in the related art, since the optical adjustment is not performed in a state of all the optical systems of the lens barrel, it is not possible to completely remove unnecessary aberration, or it is necessary to use another optical adjustment mechanism in other places. Therefore, there is a concern that the remaining amount of aberration further increases. However, in embodiment 1, by operating the cam follower 110 from the radial direction of the first fixing member 105, since the tilt of the first guide bar 109 is adjusted in the plane perpendicular to the optical axis OA, therefore, the optical adjustment can be performed in the state of the entire optical element system of the lens apparatus 100. That is, since the optical adjustment is not performed in a state of a partial unit, it is possible to perform the optical adjustment including the aberration generated in the lens other than the second lens barrel 111 guided by the first guide bar 109. Therefore, the optical performance can be improved.

Further, as compared with the case where the end portion of the first guide bar 109 is accessed from the optical axis direction as in the related art, in embodiment 1, the cam follower 110 is accessed from the outer peripheral side in the radial direction of the first fixing member 105, so that the optical adjustment of the entire optical element system can be performed. With this configuration, the space required in the optical axis direction can be reduced. According to the embodiment 1, the lens apparatus 100 advantageous in terms of optical adjustment can be provided.

Figure 8A:
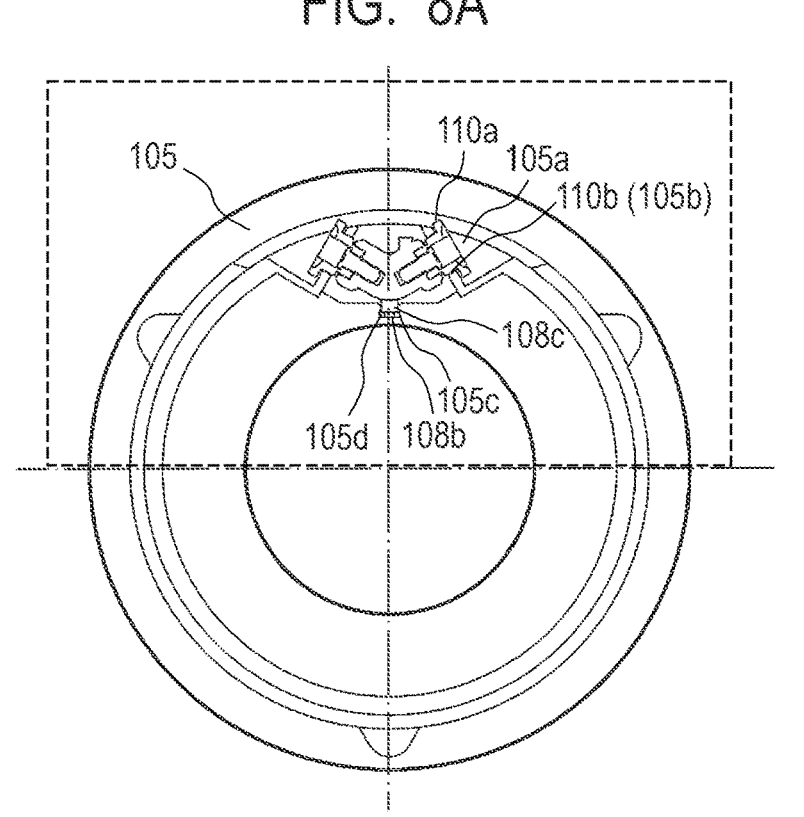
FIGS. 8A and 8B are both cross-sectional views of the first fixing member (105) including the first adjustment mechanism.
Figure 8B:
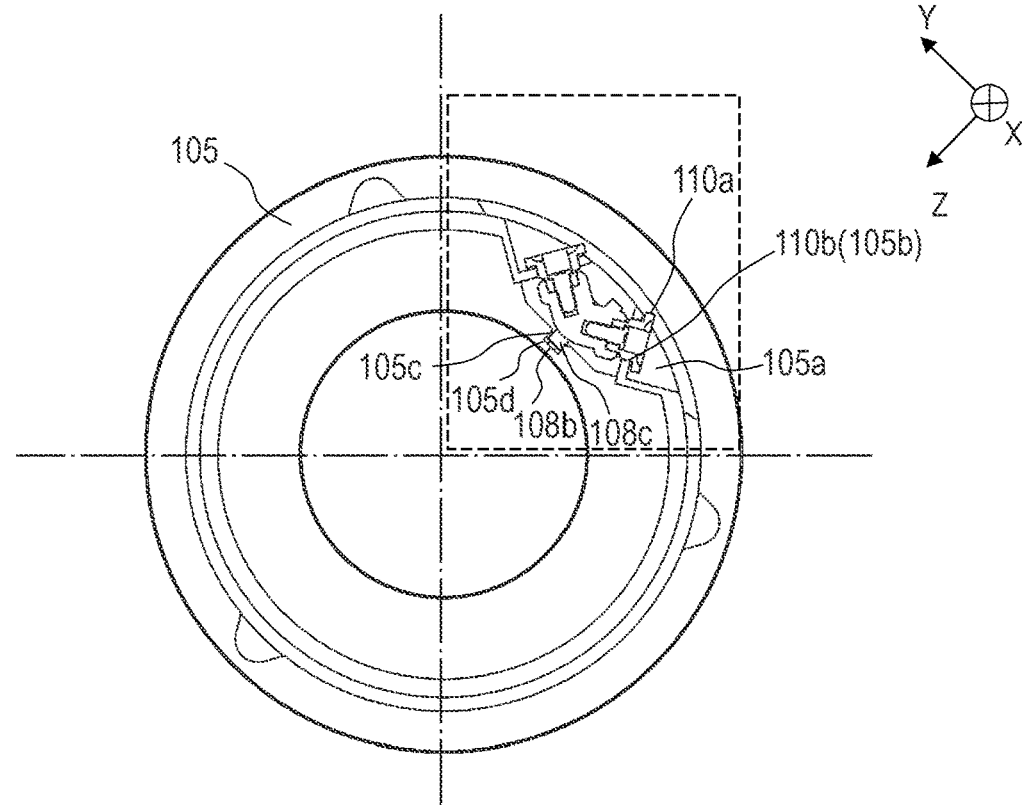

FIGS. 8A and 8B are sectional views of the first fixing member 105 including the first adjustment mechanism in a plane orthogonal to the optical axis OA, which are divided into four quadrants by a horizontal line segment and a vertical line segment passing through the optical axis OA. FIG. 8A illustrates a state in which the first adjustment mechanism is positioned across two quadrants. FIG. 8B illustrates a state in which the first adjustment mechanism is positioned in one quadrant.

As illustrated in FIG. 8A or FIG. 8B, the second regulating portion 108b and the third regulating portion 108c of the bar holding member 108, and the first guide portion 105c and the fourth regulating portion 105d of the first fixing member 105 are in a quadrant including the first regulating portion 105a and the first long groove 105b. Therefore, a mechanism for decentering the bar holding member 108 can be configured in a narrow space around the axis A of the first guide bar 109, and a more compact adjustment mechanism can be provided. In addition, it is possible to increase the degree of freedom in the layout of peripheral members.

When the eccentricity of the bar holding member 108 is adjusted, there is a concern that large sliding friction is generated between the cam follower 110 and the first fixing member 105, and between the second regulating portion 108b and the third regulating portion 108c of the bar holding member 108 and the first fixing member 105. Therefore, as illustrated in FIG. 6B, the first guide portion 105c of the first fixing member 105 has an arc-shaped cross section so as to be in line contact with the third regulating portion 108c of the bar holding member 108. With this shape, sliding friction during adjustment can be suppressed as compared with the case where the first guide portion 105c and the third regulating portion 108c are in surface contact with each other.

Further, in order to further suppress the sliding friction, the engaging portion between the cam follower 110 and the first fixing member 105, and the engaging portions between the second regulating portion 108b and the third regulating portion 108c of the bar holding member 108 and the first fixing member 105 may be set to allow a slight backlash. To be more specific, slight backlash is allowed between the first cylindrical portion 110a and the first regulating portion 105a, between the second cylindrical portion 110b and the first long groove 105b, between the third regulating portion 108c and the first guide portion 105c, and between the second regulating portion 108b and the fourth regulating portion 105d. With this configuration, the twisting during adjustment is eliminated and the sliding friction can be reduced.

On the other hand, if the backlash is allowed, there is a concern that the state of the tilt of the first guide bar 109 may change within the range of the backlash from the optically adjusted state depending on the change in the posture of the lens apparatus 100. Therefore, as illustrated in FIG. 2, a biasing member 118 is attached to the first fixing member 105.

The bar holding member 108 is provided with a receiving portion 118e that receives the biasing force F from a pressing portion 118a of the biasing member 118, and the receiving portion 108e is tilted with respect to the optical axis OA. With this shape, the biasing force F from the pressing portion 118a of the biasing member 118 acts as an optical axis direction component F2 that presses the bar holding member 108 in the optical axis direction and an offset component F1 that presses the bar holding member 108 in the Z direction parallel to the direction orthogonal to the optical axis OA.

Figure 9:
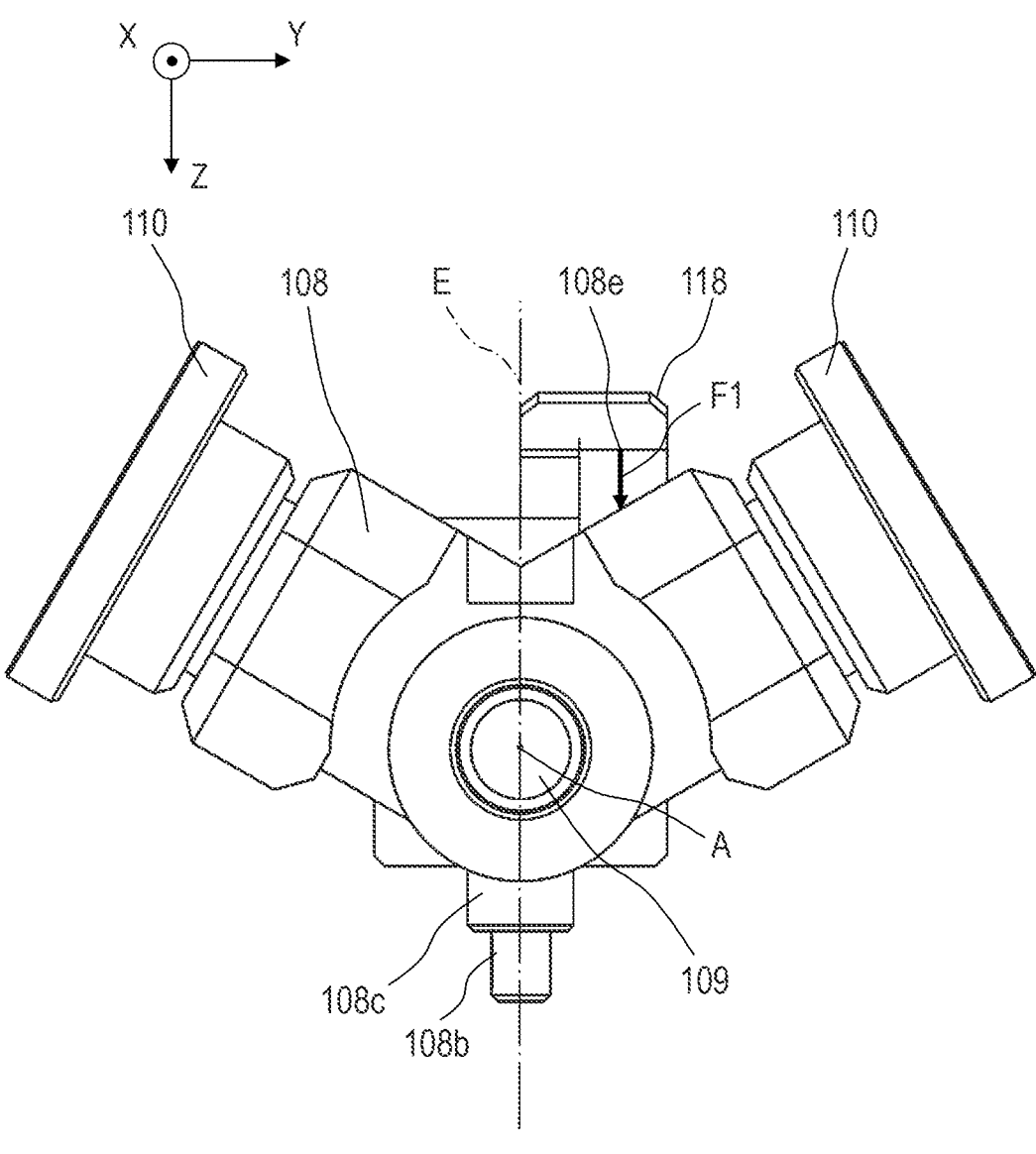
FIG. 9 is a view showing a state in which the biasing member (118) is attached.

FIG. 9 is a view of a state in which the cam follower 110, the first guide bar 109, and the biasing member 118 are assembled to the bar holding member 108, viewed from the direction of the axis A of the first guide bar 109. In embodiment 1, a plate spring is used as the biasing member 118. The receiving portion 108e of the bar holding member 108 is not on the line E orthogonal to the axis A of the first guide bar 109 when viewed in the direction orthogonal to the optical axis OA. That is, the bar holding member 108 receives, from the biasing member 118, an offset component F1 (rotational force) for rotating the bar holding member 108 about the axis A of the first guide bar 109 and an optical axis direction component F2 (biasing force) for pressing the bar holding member 108 in the optical axis direction. In this manner, the bar holding member 108 is pressed in the direction of rotation of the first guide bar 109 about the axis A and in the direction of the optical axis, and is biased to eliminate the backlash.

Here, an example in which a plate spring is used as means for applying the biasing force F has been described, but a different form may be adopted as long as the purpose can be achieved. For example, a form such as a tension coil spring having hook-shaped portions at both ends may be adopted. In this case, an engaged portion with which the hook-shaped portion is engaged may be provided on the bar holding member 108 and the first fixing member 105, and the biasing force F may be applied to the bar holding member 108 to eliminate the rattling.

According to the embodiment 1, it is possible to provide the lens apparatus 100 having the first adjustment mechanism capable of performing the tilt adjustment from the outer peripheral side of the first guide bar 109 that guides the second lens barrel 111 holding the lens in a straight line in the state of the entire optical element system.

Embodiment 2

In the embodiment 1, the first guide bar 109 is tilted by decentering the bar holding member 108, which holds the one end portion 109a of the first guide bar 109, in the plane orthogonal to the optical axis OA, and the tilt adjustment of the second lens barrel 111, which is linearly guided by the first guide bar 109, can be performed. However, as the optical adjustment method of the second lens barrel 111, not only the tilt adjustment but also the eccentricity adjustment may be required.

Figure 10:
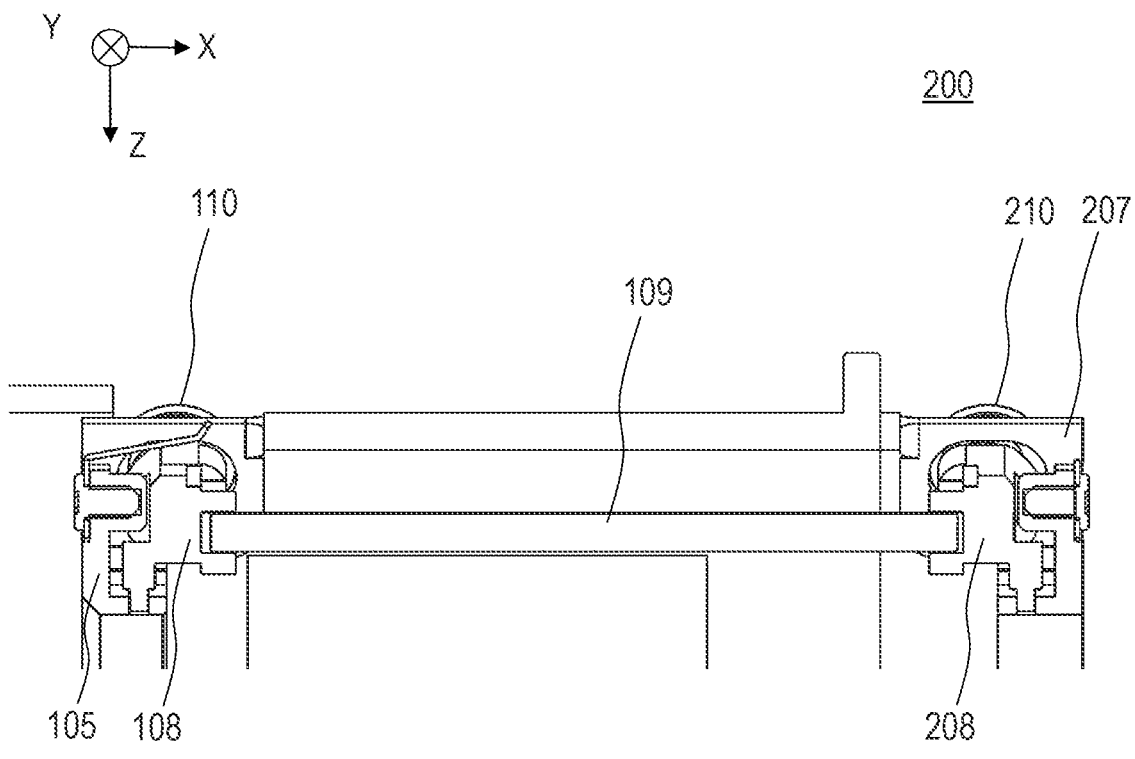
FIG. 10 is a partial cross-sectional view of a second adjustment mechanism of the lens apparatus (200) according to embodiment 2.

FIG. 10 is a partial sectional view of a second adjustment mechanism used in the lens apparatus 200 according to embodiment 2. In the embodiment 2, in addition to the configuration of the embodiment 1, the other end portion 109b (opposite end side) of the first guide bar 109 is held by a second bar holding member 208 (second holding member), and a mechanism equivalent to the first adjustment mechanism provided on the one end portion 109a side is also applied to the other end portion 109b side. A second bar holding member 208 and a second cam follower 210 (second operating member) according to the embodiment 2 have configurations corresponding to the bar holding member 108 and the cam follower 110 according to the embodiment 1, respectively.

Figure 11:
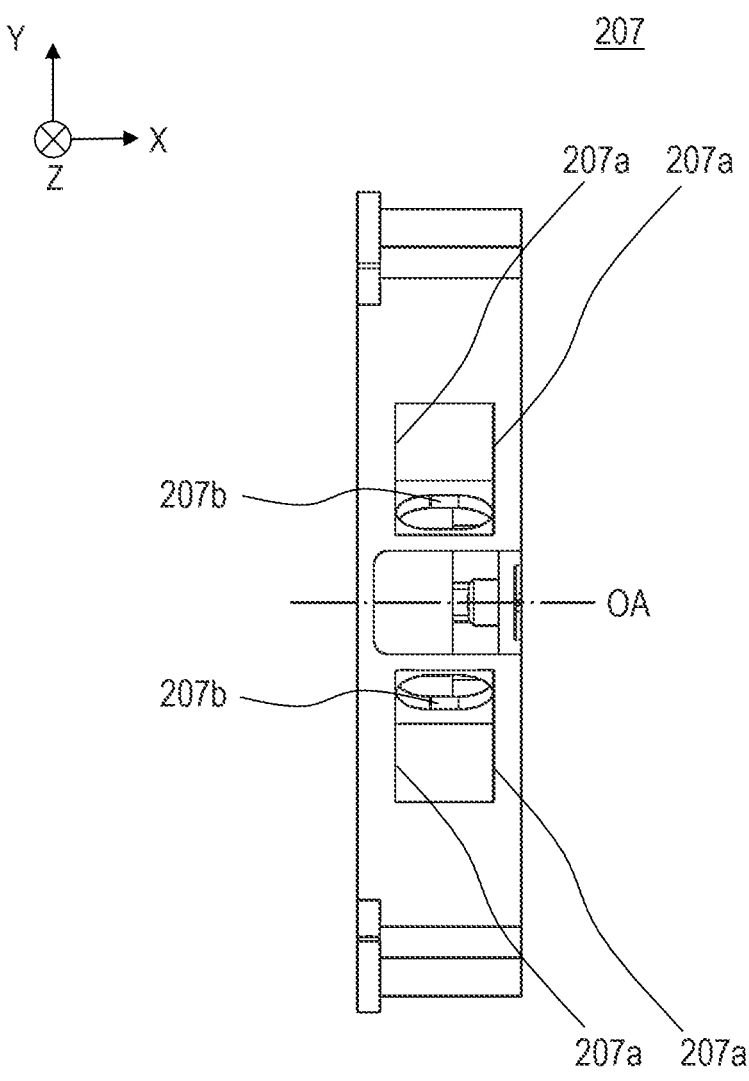
FIG. 11 is a plan view of the second fixing member (207) as viewed from the Z direction.

FIG. 11 is a plan view of the second fixing member 207 according to the embodiment 2 as viewed from the Z direction. The second fixing member 207 is provided with a sixth regulating portion 207a which engages with the first cylindrical portion 210a of the second cam follower 210 to regulate the movement of the second cam follower 210 in the optical axis direction. In addition, the second fixing member 207 is provided with a second long groove 207b which engages with the second cylindrical portion 210b of the second cam follower 210 and is penetrated from the outer periphery to the inner periphery of the second fixing member 207. The longitudinal direction of the second long groove 207b is parallel to the optical axis OA. The second bar holding member 208 engages with the second cam follower 210, and is held by the second fixing member 207 via the second cam follower 210.

Figure 12:
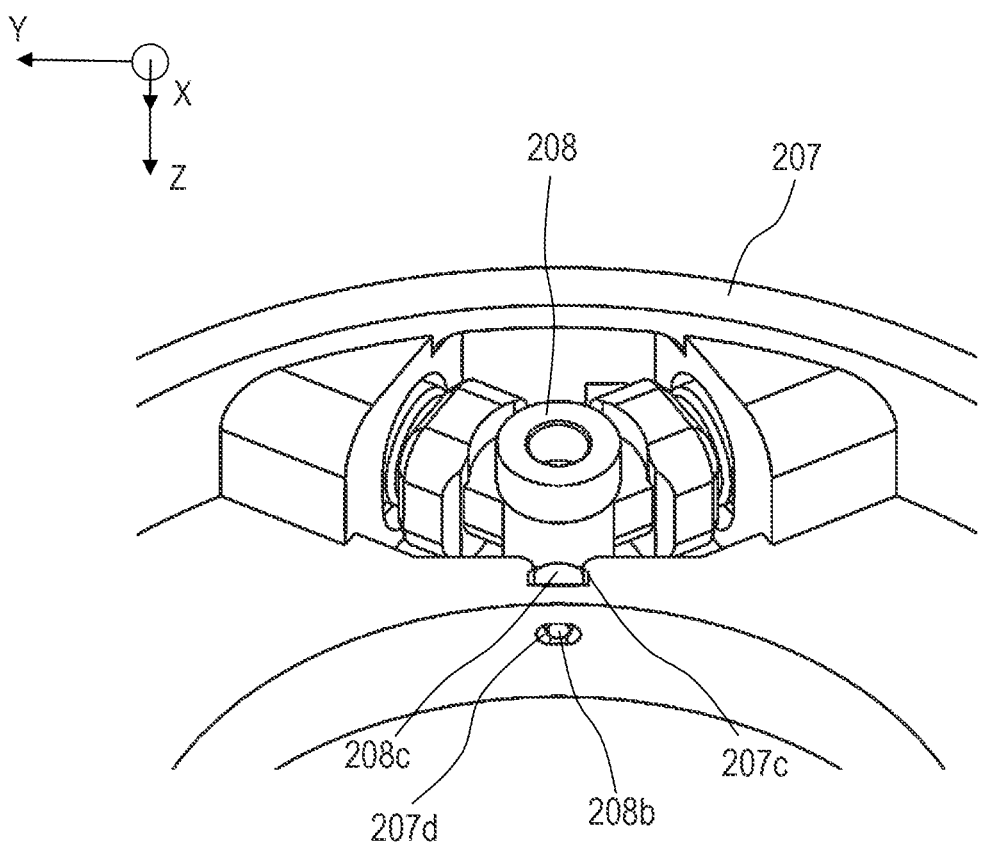
FIG. 12 is a perspective view of the second adjustment mechanism as viewed from the inside of the second fixing member (207).

FIG. 12 is a perspective view of the second adjusting mechanism of the embodiment 2 as viewed from the inside. The second regulating portion 208b of the second bar holding member 208 engages with the fifth regulating portion 207d of the second fixing member 207 to regulate the movement of the second bar holding member 208 in the optical axis direction. And the third regulating portion 208c of the second bar holding member 208 engages with the second guide portion 207c provided in the second fixing member 207 and parallel to the optical axis OA to regulate the rotation of the second bar holding member 208 around the axis of the first guide bar 109. In embodiment 2, a sixth regulating portion 207a, second long groove 207b, second guide portion 207c, and a fifth regulating portion 207d are provided on the second fixing member 207. Those correspond to the first regulating portion 105a, the first long groove 105b, the first guide portion 105c, and fourth regulating portion 105d provided in the first fixing member 105 of embodiment 1, respectively.

Next, the eccentricity adjustment of the first guide bar 109 will be described. During optical adjustment by rotating at least one of the two second cam followers 210 from the outer peripheral side in the radial direction of the second fixing member 207, the second bar holding member 208 is decentered in a plane orthogonal to the optical axis OA. The plurality of second cam followers 210 can be independently operated. Then, the other end portion 109b of the first guide bar 109 is decentered in a plane orthogonal to the optical axis OA together with the second bar holding member 208, and the first guide bar 109 is tilted with respect to the optical axis OA with the one end portion 109a of the first guide bar 109 as a fulcrum. That is, by operating the second cam follower 210 from the direction orthogonal to the optical axis OA of the second fixing member 207, the tilt of the other end portion 109*b* side with respect to the optical axis direction of the first guide bar 109 can be adjusted in the plane orthogonal to the optical axis OA. At this time, the bar holding member 108 on the one end portion 109*a* side of the first guide bar 109 and the second bar holding member 208 on the other end portion 109*b* side can be decentered in the same direction by cooperating with the first adjustment mechanism of the embodiment 1. By performing the eccentricity adjustment of the bar holding member 108 and the second bar holding member 208 in this way, it is also possible to perform only the eccentricity adjustment without tilting the first guide bar 109.

Figure 13:
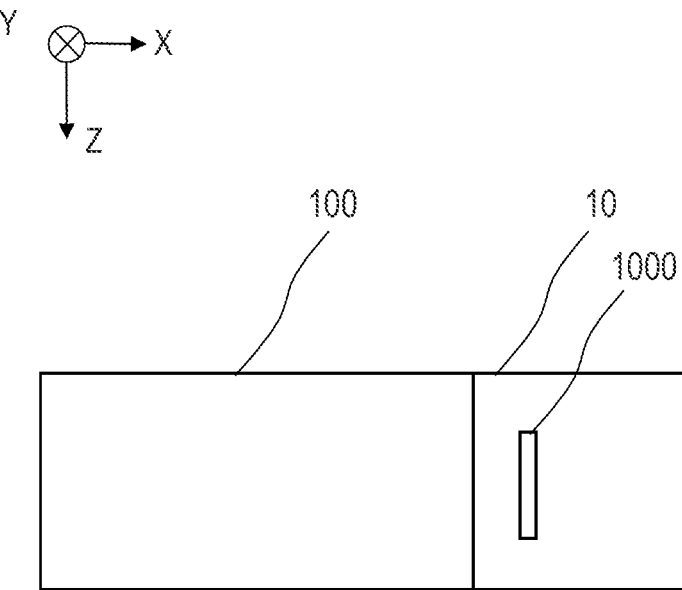
FIG. 13 is a schematic diagram illustrating a configuration embodiment of an image pickup apparatus.

As illustrated in FIG. 13, the lens apparatus 100 to which the embodiment 1 is applied is used for a camera apparatus (an image pickup apparatus) including an image sensor 1000 (an image pickup element) that captures an image formed by the lens apparatus 100 or an image capturing system including an image capturing apparatus main body that includes the image sensor 1000 and to which the lens apparatus 100 is detachably attached. Further, the present disclosure is also applicable to the lens-integrated imaging device 10 (image pickup apparatus). The same applies to the lens apparatus 200 to which the embodiment 2 is applied.

Although preferred embodiments and embodiments of the present disclosure have been described above, the present disclosure is not limited to these embodiments and embodiments, and various modifications and changes can be made within the scope of the gist of the present disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-079906, filed May 16, 2022, which is hereby incorporated by reference herein in its entirety.

What is claimed is:

1. A lens apparatus comprising:
a holding frame configured to hold a lens;
a guide member configured to guide the holding frame in an optical axis direction;
a first holding member configured to hold one end side of the guide member;
a first engaging member configured to engage with the first holding member; and
a first fixing member configured to hold the first holding member via the operating first engaging member,
wherein the first engaging member includes a first cylindrical portion, a second cylindrical portion, and a third cylindrical portion,
wherein axes of the first cylindrical portion and the second cylindrical portion are eccentric, and axes of the first cylindrical portion and the third cylindrical portion are coaxial,
wherein the first fixing member includes a first regulating portion that engages with the first cylindrical portion and a first groove portion that engages with the second cylindrical portion,
wherein the first regulating portion regulates movement of the first engaging member in the optical axis direction,
wherein the first groove portion penetrates the first fixing member from an outer periphery to an inner periphery of the first fixing member, and
wherein a position of the one end side of the guide member in a direction perpendicular to an optical axis is adjustable by rotating the first engaging member with respect to the first fixing member.

2. The lens apparatus according to claim 1,
wherein the first holding member includes a second regulating portion, a third regulating portion, and an engaging portion that engages with the third cylindrical portion,
wherein the first fixing member has a fourth regulating portion which engages with the second regulating portion to regulate the movement of the first holding member in the optical axis direction, and a first guide portion which engages with the third regulating portion and is parallel to the optical axis,
wherein the first regulating portion, the first groove portion, the fourth regulating portion, and the first guide portion are provided at different angular positions around the axis of the guide member, and
wherein, when a plane orthogonal to the optical axis is divided into four quadrants by a horizontal line segment passing through the optical axis and a vertical line segment passing through the optical axis, the fourth regulating portion and the first guide portion are located in a quadrant including the first regulating portion and the first groove portion.

3. The lens apparatus according to claim 1, further comprising a fastening member for fastening the first engaging member to the first holding member,
wherein the first engaging member is fastened to the first holding member by the fastening member after the adjustment of the first holding member.

4. The lens apparatus according to claim 1,
wherein the first engaging member is provided with a cutout portion to be engaged with a tool for rotating the first engaging member, and
wherein a direction in which the cutout portion extends is a mark for distinguishing a direction in which the second cylindrical portion is decentered.

5. The lens apparatus according to claim 1, further comprising a biasing member,
wherein the first holding member receives a rotational force around an axis of the guide member and a biasing force in the optical axis direction from the biasing member.

6. The lens apparatus according to claim 1, further comprising:
a second holding member configured to hold an opposite end side of the guide member;
a second engaging member configured to engage with the second holding member, and
a second fixing member configured to hold the second holding member via the second engaging member,
wherein a position of the other end side of the guide member in a direction perpendicular to the optical axis is adjustable by rotating the second engaging member with respect to the second fixing member.

7. The lens apparatus according to claim 6,
wherein the second fixing member includes a fifth regulating portion that engages with the second regulating portion of the second holding member to regulate movement of the second holding member in the optical axis direction, a second guide portion that engages with the third regulating portion of the second holding member and is parallel to the optical axis, a sixth regulating portion that engages with the first cylindrical portion of the second engaging member, and a second groove portion that engages with the second cylindrical portion of the second engaging member and is inserted from the outer periphery to the inner periphery of the second fixing member.

8. An image pickup apparatus comprising:

the lens apparatus according to claim 1; and an image pickup element configured to capture an image formed by the lens apparatus.

9. The image pickup apparatus according to claim 8, wherein the lens apparatus is detachable from the image pickup apparatus.

10. A lens apparatus comprising:

a holding frame configured to hold a lens;

a guide member configured to guide the holding frame in an optical axis direction;

a first holding member configured to hold one end side of the guide member;

a first engaging member configured to engage with the first holding member;

a first fixing member configured to hold the first holding member via the first engaging member;

a second holding member configured to hold an opposite end side of the guide member;

a second engaging member configured to engage with the second holding member; and a second fixing member configured to hold the second holding member via the second engaging member, wherein a position of the one end side of the guide member in a direction perpendicular to an optical axis is adjustable by rotating the first engaging member with respect to the first fixing member, and wherein a position of the other end side of the guide member in a direction perpendicular to the optical axis is adjustable by rotating the second engaging member with respect to the second fixing member.

11. An image pickup apparatus comprising:

the lens apparatus according to claim 10; and an image pickup element configured to capture an image formed by the lens apparatus.

\* \* \* \* \*